Dec. 27, 1960   E. H. OLSON   2,966,073
CONTROL DEVICE
Filed Dec. 31, 1958

INVENTOR.
ELWYN H. OLSON
BY *Robert S. Craig*
ATTORNEY

United States Patent Office 2,966,073
Patented Dec. 27, 1960

2,966,073
CONTROL DEVICE

Elwyn H. Olson, St. Paul, Minn., assignor to Minneapolis-Honeywell Regulator Company, Minneapolis, Minn., a corporation of Delaware Filed Dec. 31, 1958, Ser. No. 784,387

6 Claims. (Cl. 74—504)

This invention is directed to a control device in which the two operating points are adjustable.

An object of the invention is to provide a condition responsive control in which operating differential is adjustable and in which the two operating points are indicated in terms of condition value.

A more specific object is to provide a pressure actuated switch having a pick-up spring type of differential adjustment in which the cut-in and cut-out points are independently indicated, obviating the necessity of mentally adding or subtracting differential to ascertain one of the switch actuating points.

In a well known pick-up spring differential adjusting arrangement, a main spring opposes expansion of a bellows or diaphragm throughout a range of movement that will operate a switch between "on" and "off" positions, the switch being of a type that has appreciable differential of movement between its two operating positions. Another spring is arranged to become effective in opposing expansion of the diaphragm at a position between the two switch operating positions, so that the switch is moved to one operative position at a pressure determined by the added force of both springs, but will return to the other operative position only by a reduction in pressure to a value determined by the main spring alone, as the pick-up spring is ineffective in this range. The main spring may be adjusted to change the pressure at which the switch is actuated to both of its operative positions, while the pick-up spring may be adjusted to determine the difference in pressure between the two switch positions. Separate scales to indicate the adjustment of these springs in terms of pressure are customarily provided. In this case the pick-up spring scale would indicate differential and must be added to the main scale to obtain the other control pressure.

The present invention utilizes the same main and pick-up spring arrangement described above, but in addition provides a mechanism by which adjustment of the two springs is coordinated so that the two switch operating pressures are independently adjustable. One manual adjustment is arranged to adjust the main and pick-up springs simultaneously by the same amount but in opposite directions, whereby the low pressure control point is adjusted without changing the upper control point. Another manual adjustment is provided which changes only the force of the pick-up spring, and therefore adjusts only the upper control point. Suitable scale means is provided to indicate directly the upper and lower control points.

Figure 1:
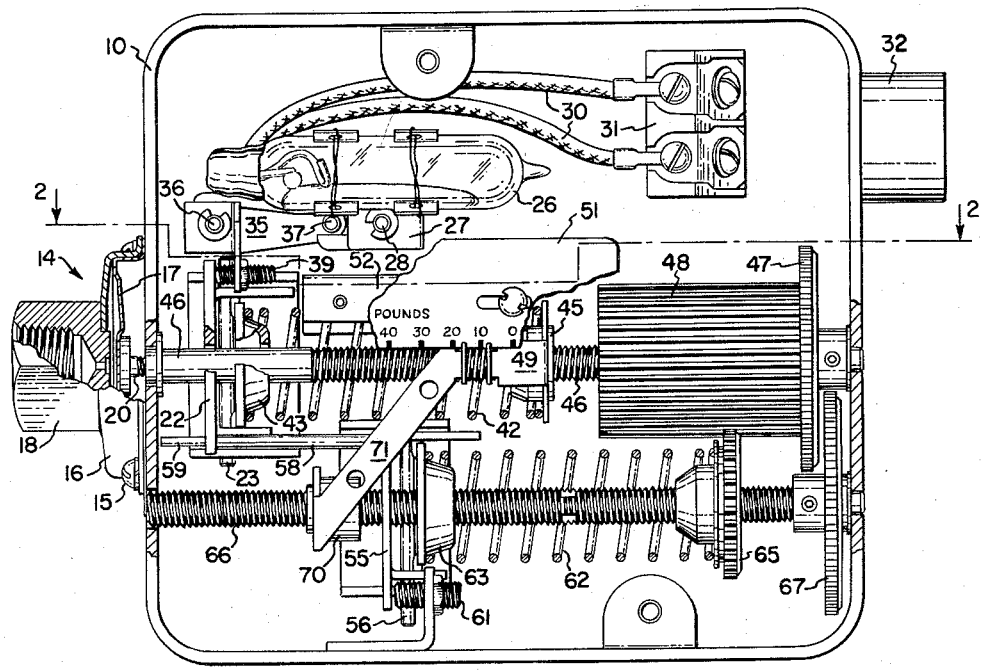
Figure 2:
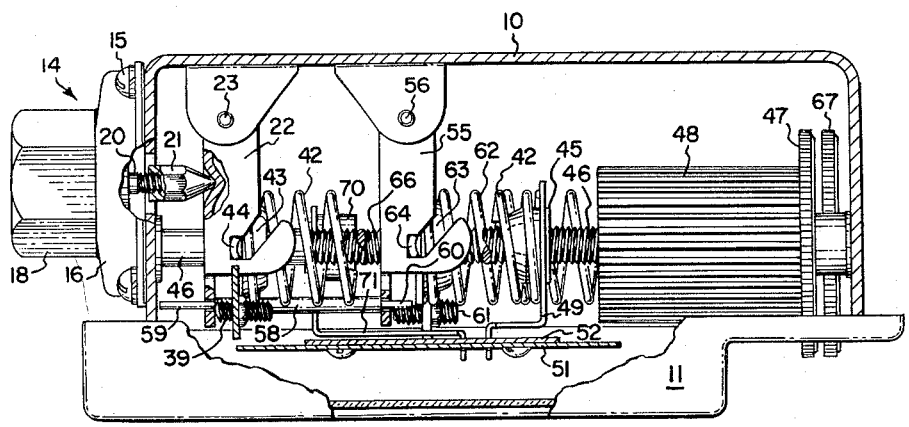

In the drawing, Figure 1 is an elevation, partly in section of a pressure switch incorporating the invention, and Figure 2 is a plan view, taken substantially on line 2—2 of Figure 1.

The pressure actuated switch shown in the drawing has a box shaped case 10 open at the front. A cover 11 completes the enclosure for the internal mechanism. A diaphragm assembly 14 is secured to the left side of the case 10 by screws 15 and includes a housing 16 within which a cup shaped diaphragm 17 is fitted. A pressure connection 18 is secured to the exterior of housing 16.

The diaphragm 17 has a threaded stud 20 secured to its center portion and extending through an opening in case 10. An internally threaded actuator 21 is adjustably carried on stud 20 and engages a lever 22 pivotally mounted in case 10 on a pin 23.

A mercury switch 26 is secured in a clip 27 which is pivotally mounted in case 10 on a pin 28. Flexible wires 30 lead from the mercury switch 26 to a terminal block 31 which is accessible from a conduit connector 32 secured to case 10. A bell crank lever 35 is pivoted on a pin 36 extending from the rear of case 10. The right hand end of lever 35 has a pin 37 which engages the clip 27 to tilt the mercury switch. A small amount of lost motion is provided in this connection so that there will be an appreciable difference in the positions of lever 35 required to actuate the switch in opposite directions. A downward extension of lever 35 carries an adjustable abutment screw 39 adapted to engage lever 22. A light spring, not shown, biases the bell crank lever 35 in a clockwise direction so that it will follow movements of the lever 22.

Expansion of diaphragm 17 is opposed by a main spring 42, one end of which engages a saddle 43 having oppositely extending ears 44 that are curved to provide a rockable connection with the lever 22. The opposite end of the spring 42 engages a nut 45 that is carried on a threaded portion of a rod 46 extending between opposite sides of case 10 and journaled therein. At its right hand end the rod 46 carries a knurled wheel 47, so that it may be turned manually, and a gear 48 of substantial axial length. A control point indicating arm 49 extends laterally from nut 45 and extends through a slot in a scale plate 51 which is supported in case 10 on a bracket 52. The arm 49 is held by the slot to prevent rotation of nut 45 when rod 46 is turned, and also cooperates with indicia of pressure on the scale plate 51 to indicate the pressure at which the switch will be moved to "on" position as a result of decreasing pressure.

Another lever 55 is pivotally mounted in case 10 on a pin 56. Lever 55 is similar to lever 22 and their pivotal axes are parallel. A rod 58 is adapted to transmit motion of lever 22 to lever 55. At its left end the rod has a portion 59 of reduced diameter passing through an opening in the lever 22, and at its right end a portion 60 of reduced diameter passing through an opening in lever 55. Force is transmitted between the two levers by the shoulders formed at the reduced portions while the reduced portions serve as guides for the rod. The extreme left end of reduced portion 59 is adapted to engage the case 10 at a position of lever 22 intermediate the range of movement required to move the mercury switch 26 between its two operative positions. The screw 39 on bell crank lever 35 is adjusted so that the mercury switch will remain in either "on" or "off" positions when lever 22 is in engagement with the shoulder on rod 58 and the left end of reduced portion 59 of rod 58 is touching case 10. A stop screw 61 carried by case 10 is adapted to engage lever 55 to limit movement of the diaphragm 17 and switch 26.

When pressure on the diaphragm 17 is sufficiently high to move the lever 22 to pick up the rod 58 and move it away from case 10 a pick-up spring 62 also opposes expansion of the diaphragm. One end of spring 62 engages a saddle 63 having oppositely extending ears 64 that are curved to provide a rockable connection with the lever 55. The opposite end of the spring 62 engages a nut 65 that is carried on a threaded rod 66 extending between opposite sides of case 10 and journaled therein on an axis substantially parallel to that of rod 46. At its right hand end the rod 66 carries a knurled wheel 67, so that it may be turned manually. The nut 65 has gear teeth on its periphery cooperating with the gear 48 on rod 46.

A nut 70 is carried on the left hand portion of threaded rod 66, and in turn this nut carries a control point indicating arm 71 which has an indicator on its other end that extends through the slot in the scale plate 51. The arm 71 prevents rotation of nut 70 and also cooperates with the indicia of pressure on the scale plate 51 to indicate the pressure at which the switch will be moved to "off" position as a result of increasing pressure.

In the illustrative embodiment, the main spring 42 and the pick-up spring 62 are substantially identical as to spring rate. Also, the gear 48 and the gear provided on nut 65 have the same number of teeth. In addition, the threads on rods 46 and 66 are of the same pitch. However, rod 46 is provided with left hand threads, while rod 66 is provided with right hand threads.

As with known pick-up spring differential adjusting mechanisms, the switch is moved to one operative position at a pressure determined by the force of the main spring alone, and is moved to its other operative position at a pressure determined by the sum of the forces of the main spring and the pick-up spring. At pressures insufficient to move the rod 58 out of engagement with case 10, the force of pick-up spring 62 is opposed by case 10 through rod 53 and lever 55, so that only main spring 42 opposes the diaphragm 17.

If the wheel 67 is stationary and the wheel 47 is turned manually in a direction to move indicating arm 49 to the left, the lower control point will be increased as the force of main spring 42 will be increased. At the same time, gear 48 will turn nut 65 in a direction to reduce the force of spring 62 by the same amount that the force of spring 42 is increased. Since the upper control point depends on the force of both springs 42 and 62, it will be unaffected by adjustment of the lower control point. Note that the rod 66 remained stationary and that therefore, the indicating arm 71 did not move.

If the wheel 47 remains stationary and wheel 67 is turned, the nut 65 is prevented from turning by engagement of the gear teeth and the nut will move axially with its teeth sliding along the gear 48. If the direction of rotation of the rod 66 is such as to move nut 65 to the left, the force of spring 62 will be increased to raise the upper control point. Nut 70 and indicator arm 71 will be moved also to indicate a higher pressure on the scale. Note that the force of spring 42 is not affected by this adjustment and that the lower control point as indicated by arm 49 is unaffected. Hence, it will be apparent that independent adjustment and indication of the upper and lower control points of this pressure responsive switch is provided.

I claim as my invention:

1. In a control device having a differential adjustment, a condition responsive element, control means positioned by said condition responsive element, main and pickup springs acting on said element, first and second substantially parallel screws each having manually operable means to effect rotation thereof, a first nut on said first screw bearing on said main spring, a second nut on said second screw bearing on said pick-up spring, means to prevent rotation of said first nut, a first gear rotatable with said first screw, a second gear rotatable with said second nut and cooperating with said first gear, a fixed scale having indicia of condition value spaced thereon parallel to said screws, a first index cooperating with said scale and movable with said first nut, a third nut on said second screw, means to prevent rotation of said third nut, and a second index cooperating with said scale and movable with said third nut.

2. In a control device having a differential adjustment, a condition responsive element, control means positioned by said condition responsive element, main and pick-up springs acting on said element, first and second substantially parallel screws each having manually operable means to effect rotation thereof, a first nut on said first screw bearing on said main spring, a second nut on said second screw bearing on said pick-up spring, means to prevent rotation of said first nut, a first gear rotatable with said first screw, a second gear rotatable with said second nut and cooperating with said first gear, fixed scale means having indicia of condition value thereon, a first index cooperating with said scale means and movable by said first nut, a third nut on said second screw, means to prevent rotation of said third nut, and a second index cooperating with said scale means and movable by said third nut.

3. In a control device having a differential adjustment, a condition responsive element, control means positioned by said condition responsive element, a main spring acting on said element throughout a range of movement, a pick-up spring acting on said element through a portion of its range of movement, first manually positionable means adapted to simultaneously adjust said main and pick-up springs, second manually positionable means adapted to adjust only said pick-up spring, a scale comprising indicia of condition value, a first pointer cooperating with said scale and positioned by said first manually positionable means, and a second pointer cooperating with said scale and positioned by said second manually positionable means.

4. In a control device having a differential adjustment, a condition responsive element, control means positioned by said condition responsive element, a main spring acting on said element throughout a range of movement, a pick-up spring acting on said element through a portion of its range of movement, first manually positionable means adapted to simultaneously adjust said main and pick-up springs to increase the effective force of one of said springs while decreasing the effective force of the other by the same amount, second manually positionable means adapted to adjust only said pick-up spring, a scale comprising indicia of condition value, a first pointer cooperating with said scale and positioned by said first manually positionable means, and a second pointer cooperating with said scale and positioned by said second manually positionable means.

5. In a control device having a differential adjustment, a condition responsive element, control means positioned by said condition responsive element, a main spring acting on said element throughout a range of movement, a pick-up spring acting on said element through a portion of its range of movement, first manually positionable means adapted to simultaneously adjust said main and pick-up springs, second manually positionable means adapted to adjust only said pick-up spring, and indicators of condition value positioned by each of said manually positionable means.

6. In a control device having a differential adjustment a condition responsive element, control means positioned by said condition responsive element, a main spring acting on said element throughout a range of movement, a pick-up spring acting on said element through a portion of its range of movement, first manually positionable means adapted to simultaneously adjust said main and pick-up springs to increase the effective force of one of said springs while decreasing the effective force of the other by the same amount, second manually positionable means adapted to adjust only said pick-up spring, and indicators of condition value positioned by each of said manually positionable means.

References Cited in the file of this patent

UNITED STATES PATENTS

| | | |
|---|---|---|
| 2,291,502 | Persons | July 28, 1942 |
| 2,311,478 | Shaw | Feb. 16, 1943 |
| 2,556,519 | Bowar | June 12, 1951 |